United States Patent
Hiatt

[11] Patent Number: 6,025,152
[45] Date of Patent: Feb. 15, 2000

[54] DENITRIFYING BACTERIAL PREPARATION AND METHOD

[76] Inventor: William N. Hiatt, 5029 Falcon, Long Beach, Calif. 90807

[21] Appl. No.: 08/868,445

[22] Filed: Jun. 3, 1997

[51] Int. Cl.[7] .................................................. C12P 39/00
[52] U.S. Cl. ............................ 435/42; 435/262; 435/264; 435/832; 435/834; 435/836; 435/839
[58] Field of Search ............................... 435/42, 262, 264, 435/832, 836, 839, 834

[56] References Cited

U.S. PATENT DOCUMENTS

| | | | |
|---|---|---|---|
| 4,288,545 | 9/1981 | Spraker | 435/42 |
| 4,745,064 | 5/1988 | Cook et al. | 435/42 |

OTHER PUBLICATIONS

Biotech Abstract 97–09909 Uma et al Can. J. Microbiol (1997) 43, 6, 595–598.

APS JPOABS JP06–327467 Uzura et al May 26, 1993 "New Microorganisms".

Derwent Abs 87–314907 Steter Abstract EP–244663 Nov. 11, 1987.

Biotech Abstract 93–07504 "New Bacillus licheniformis bacterium having aflatoxin decomposing activity" Abstract EP–537418, Apr. 1993.

*Primary Examiner*—Herbert J. Lilling
*Attorney, Agent, or Firm*—Lawrence S. Cohen

[57] ABSTRACT

A method and mixture for denitrifying aerobic bacterial compositions and for aerobic methods for biological treatment of aqueous systems polluted by nitrogen waste products. A mixture of and limited to bacillus bacteria are added to the treatment subject. Optionally enzymes can be added to the mixture. Optionally a particulate carbon ingredient can be placed into the treatment subject. Optionally a living tissue ingredient can be used.

29 Claims, No Drawings

DENITRIFYING BACTERIAL PREPARATION AND METHOD

FIELD OF INVENTION

The present invention relates to new denitrifying aerobic bacterial compositions and to aerobic methods for biological treatment of aqueous bodies and aqueous systems polluted by nitrogen waste products.

BACKGROUND OF INVENTION

Water systems commonplace in today's environment including aquarium aquaculture, streams, rivers, ponds, lakes, and ground water, are all subject to contamination by many inorganic and organic compounds, as well as nitrogen waste components, in particular, ammonium, nitrites and nitrates, which at certain concentrations become highly toxic. Municipal wastewater solutions, for examples raw sewage, and industrial effluents, often contain high levels of ammonium as well as phenols, cyanides, sulfates, thiocyanates, thiosulfates, and other toxic waste compounds. Many spent military explosives contain organonitrate waste, and removing such waste in an economical fashion without contamination of the environment remains a challenge. These nitrogen waste streams are one of the principal major ecological and environmental problems facing mankind, and will continue to pose serious problems as the population grows and waste production increases.

PRIOR ART

Removing nitrogen waste from contaminated aqueous bodies and wastewater streams is accomplished primarily by bacterial degradation. Specifically, bacteria from the families of Nitrosomas, Nitrobactor, and Pseudomonas are used to digest the nitrogen waste. These bacterial types are members of the well-characterized nitrogen cycle. The bacterial families of the classical nitrogen cycle act to transform nitrogen containing waste products to nitrogen gas and other, offensive odiferous and environmentally contaminating gases. Bacterial cultures from the Nitrosomas and Nitrobactor families convert, via aerobic bioxidative processes, the ammonia or organic amine waste to nitrate waste. At very low or with no oxygen present, pseudomonas bacterial cultures are employed to bioreduce the nitrate waste products and transform such waste into nitrogen gas in combination with methane, sulfur dioxide, hydrogen sulfate and carbon dioxide. This bioreduction by Pseudomonas cultures is accomplished anaerobically. The time required to establish the classical nitrogen cycle using the nitrobacter and pseudomonas families is from about twenty eight days to six weeks, and is dependent upon: (a) temperature; (b) bio mass available for culture; (c) the amount and type of biological platform for colonization; (d) concentration of hydronium ion (pH); (e) amount of dissolved oxygen; and, (f) available food (REF). Optimal conditions for the biological redox processes of removing nitrogen pollutants from water bodies, or wastewater streams requires a fine balance of these factors; limiting one or more results in a significantly less efficient biological processing and thus engendering a substantially longer time to process the waste.

The prior art has many examples of teachings that employ bacterial compositions to accomplish, or aid in accomplishing, the biologically mediated purification of wastewater. For example, denitrifying bacterial compositions are used in combination with solid column packings in the teachings of Francis, U.S. Pat. No. 4,043,936. These compositions are believed to belong to the family of Pseudomonas. Hater, et al U.S. Pat. No. 4,810,385 teaches a wastewater purification process involving bacterial compositions comprising, in addition to non ionic surfactants and the lipid degrading enzymes Lipase, three strains of *Bacillus subtillis*, 3 strains of *Pseudomonas aeruginosa*, one strain of *Pseudomonas stutzeri*, one strain of *Pseudomonas putida*, and one strain of *Eschericia hermanii* grown on a bran base. Wong, et.al., U.S. Pat. No. 5,284,587 teaches a bacterial composition, that is in combination with enzymes and a gel support is necessary to achieve satisfactory waste treatment. Bacterial species mentioned in Wong et al are *Bacillus subtillis, Bacillus licheniformis*, Cellulomonas and acinetobacter lwoffi. Similarly, Wong and Lowe, U.S. Pat. No. 4,882,059 teach a process for biological treatment of wastewater comprising bacterial species that aid in the solubilization of the solid debris. The bacterial species used in the teaching of Wong and Lowe are of the following bacterial types: *Bacillus amyloliquefaciens* and aerobacter aerogenes. These bacterial types are taught to be employed primarily for solubilization and biodegradation of starches, proteins, lipids and cellulose present in the waste product.

Other patents for treating wastewater streams are Luck, U.S. Pat. No. 3,801,494; Erickson et al U.S. Pat. No. 4,159,944; Bhattacharyya, U.S. Pat. No. 4,271,013; Semp et al U.S. Pat. No. 4,566,469; Li et al, U.S. Pat. No. 5,086,036; and Rusherford et al U.S. Pat. No. 5,223,140.

The shortcomings of the prior art are the extreme sensitivity of the method, not only for the time required to establish the nitrogen cycle, but also for the criticality of the various parameters of the processes, such as pH, temperature, food source and bacterial habitat. Also, a major shortcoming of the prior art are the elaborate mechanical and chemical methods and processes required to assist the bacterial compositions in the purification process. Another major shortcoming of the prior art is that there exists no effective method to significantly reduce or eliminate completely the odiferous side-products that are produced. The gases produced by the classical denitrification biological processes, specifically hydrogen sulfide, as well as others are the source of the foul smell that is one of the most noticeable problems associated with waste treatment, and the most toxic to man and the environment.

There exists a need in treatment of aqueous bodies, wastewater streams and systems and other applications for a more efficacious and faster biological process for converting toxic inorganic and organic amino, nitroso, nitrite, nitro and nitrate so that they are non-toxic to human, animal and marine species.

SUMMARY OF THE INVENTION

The present invention is the discovery of a novel composition and method for the aerobic oxidation and reduction of organic and inorganic nitrogen waste, and in particular a unique composition of bacteria and of bacteria and enzymes that, in addition to oxidizing ammonia and nitrites, organic amines and organonitrites, will aerobically reduce nitrates to molecular nitrogen. The proper application of the present invention leads to a significantly improved method for biological processing of aqueous bodies, wastewater streams and systems that overcome many of the shortcomings of the prior art, by—in particular: (1) the elimination of toxic or explosive by-products; (2) reduction of time required to establish the nitrogen cycle (reduced from about 28 days to 1–3 days and to 24 hours); (3) reduction of sensitivity to pH; (4) elimination of the need for side-processes for "activation" or for other enzymes or apparatus to facilitate biological degredative process; and (5) the sensitivity to temperature.

The present invention includes use of a mixture of bacteria selected from and limited to bacillus bacteria for the purification of contaminated aqueous bodies, wastewater systems and wastewater streams. it is a totally aerobic process.

In one aspect the present invention includes a method for the purification of contaminated aqueous bodies, wastewater systems and wastewater streams using a composition of certain combinations of the bacterial families: *Bacillus subtillis, Bacillus sphaericus, Bacillus megatarium, Bacillus licheniformis, Enterobacter sakazakii, Bacillus coagulans, Bacillus cereus, Bacillus pasteurii, Bacillus cirroflagellosus, Bacillus pumilus*, and optionally with a carbon platform and carbon source, and optionally with the enzymes Cellulase, Amylase, Protease, Lipase, and optionally with selected pancreatic preparations, and kidney microbia compositions.

It is the prime objective of the present invention to provide for a composition and method for bacteria-mediated aerobic reduction of nitrate moieties in aqueous systems.

It is a further object of the present invention to employ novel bacterial compositions comprising the following bacterial families: *Bacillus subtillis, Bacillus sphaericus, Bacillus megatarium, Bacillus licheniformis, Enterobacter sakazakii, Bacillus coagulans, Bacillus cereus, Bacillus pasteurii, Bacillus cirroflagellosus, Bacillus pumilus*, that provide for the aerobic detoxification and purification of wastewater streams.

It is another objective of the present invention to provide for an aerobic bacterial process to establish a nitrogen cycle in about 1–3 days and more preferably in about 24 hours in aqueous media. Such process uses *Enterobacter sakazakii* and *Bacillus coagulans*. In another aspect these are used in combination with one or both *Bacillus subtillis* and *Bacillus licheniformis*. In another aspect, the bacteria used are limited to bacillus type bacteria.

It is a prime object of the present invention to provide for a composition and method for bacteria mediated reduction of organonitro or nitrate compounds, where the by products do not include toxic gases.

It is an important object of the present invention to provide for a bacteriochemical composition and method for bacteria reduction of organonitro or nitrate compounds, where the by-products are not malodiferous species.

It is another object of the present invention to provide for a bacterial composition and a method for aerobic oxidation of wastewater pollutants in aqueous environments such as wastewater streams, wastewater systems, aquariums, septic tanks, polluted water bodies, or for composting, including ammonia and its inorganic salts, nitrous acid and its salts, organic amines, organic and inorganic hydroxyl amines and nitroso compounds.

It is an important object of the present invention to provide for a bacterial composition that can reduce in septic tanks or other sewage treatment vessels and systems that amount of: sewage sludge, ammonia, nitrous and nitroso compounds, nitrates, phenols and phosphorous.

It is another prime objective of the present invention to provide for a composition and method for the treatment of water to reduce the ammonia, nitroso and nitrate, phosphorous content of drinking water.

It is yet another object of the present invention to provide for a composition and method for preventing eutrophication by effecting the total removal of nitrogen containing compounds, and for the total reduction of phosphorous containing compounds of aquaculture and marine systems.

It is an object of the present invention to provide for novel bacterial compositions and a method for starting and maintaining healthy, vital habitats for aqua systems, including salt water and fresh water aquariums, fish and fish hatcheries, and general marine aquacultures.

DETAILED DESCRIPTION OF THE INVENTION

This invention is a new composition and method for the biological treatment of aqua systems, including wastewater detoxification and vital management. In particular, the present invention is directed towards a novel biological composition and method for the treatment of contaminated aqueous systems.

In one aspect the invention is use of a mixture of bacteria selected from and limited to bacillus bacteria. The process is believed to be a totally aerobic process.

In one embodiment the essential components of the present invention are the bacterial composition, and are referred to here as Mixture A. Optionally, in an additional preferred embodiment, the bacterial composition (Mixture A) is mixed with additional ingredients, which include an enzyme and living tissue solid preparations (Mixture B), and optionally a carbon platform and carbon source (Mixture D).

The bacterial composition, Mixture A, comprises bacteria from the following families: *Bacillus subtillis, Bacillus sphaericus, Bacillus megatarium, Bacillus licheniformis, Enterobacter sakazakii, Bacillus coagulans, Bacillus cereus, Bacillus pasteurii, Bacillus cirroflagellosus* and *Bacillus pumilus*. The bacterial composition of Mixture A is present in the present invention from about 45 weight percent to about 100% total composition and preferably, from about 50 weight percent to about 90 weight percent, and most preferably from about 60 weight percent to about 70 weight percent of the total composition.

The solid spores from the bacterial family of *Bacillus subtillis* (ATCC#465,14617,14618) are present in the composition of the present invention from about 1 weight percent to about 20 weight percent, preferably about 6 weight percent to about 15 weight percent and most preferably about 10 weight percent of the total bacterial composition comprising Mixture A.

The solid spores from the bacterial family of *Bacillus sphaericus* (ATCC#4525,10208,12123,12300) are present in the composition of the present invention from about 1 part to about 20 weight percent, preferably about 6 weight percent to about 15 weight percent and most preferably about 10 weight percent of the total bacterial composition comprising Mixture A.

The solid spores from the bacterial family of *Bacillus megatarium* (ATCC#6458,6459,8245,10778) are present in the composition of the present invention from about 1 weight percent to about 20 weight percent, preferably about 6 weight percent to about 15 weight percent and most preferably about 10 weight percent of the total bacterial composition comprising Mixture A.

The solid spores from the bacterial family of *Bacillus licheniformis* (ATCC#6634,8480,21416) are present in the composition of the present invention from about 1 part to about 20 weight percent, preferably about 6 weight percent to about 15 weight percent and most preferably about 10 weight percent of the total bacterial composition comprising Mixture A.

The solid spores from the bacterial family of *Enterobacter sakazakii* (ATCC#12868,29004) are present in the composition of the present invention from about 1 part to about 20 weight percent, preferably about 6 weight percent to about 15 weight percent and most preferably about 10 weight percent of the total bacterial composition comprising Mixture A.

The solid spores from the bacterial family of *Bacillus coagulans* (ATCC#7050,15949,35670) are present in the composition of the present invention from about 1 part to about 20 weight percent, preferably about 6 weight percent to about 15 weight percent and most preferably about 10 weight percent of the total bacterial composition comprising Mixture A.

The solid spores from the bacterial family of *Bacillus cereus* (ATCC#6464,9139,10702,12480) are present in the composition of the present invention from about 1 part to about 20 weight percent, preferably about 6 weight percent to about 15 weight percent and most preferably about 10 weight percent of the total bacterial composition comprising Mixture A.

The solid spores from the bacterial family of *Bacillus pasteurii* (ATCC#6452645311859) are present in the composition of the present invention from about 1 part to about 20 weight percent, preferably about 6 weight percent to about 15 weight percent and most preferably about 10 weight percent of the total bacterial composition comprising Mixture A.

The solid spores from the bacterial family of *Bacillus cirroflagellosus* (ATCC#1441 1) are present in the composition of the present invention from about 1 part to about 20 weight percent, preferably about 6 weight percent to about 15 weight percent and most preferably about 10 weight percent of the total bacterial composition comprising Mixture A.

The solid spores from the bacterial family of *Bacillus pumilus* (ATCC#7061,14884) are present in the composition of the present invention from about 1 part to about 20 weight percent, preferably about 6 weight percent to about 15 weight percent and most preferably about 10 weight percent of the total bacterial composition comprising Mixture A.

The present invention can include an enzyme composition, Mixture B, which comprises from about 0 weight percent to about 55 weight percent, preferably from about 10 weight percent to about 45 weight percent and most preferable 28 weight percent to about 40 weight percent of the mass of the total composition (Mixture A plus Mixture B) of the present invention.

Preferably the enzymes are Cellulase, Amylase, Protease and Lipase.

A suitable source of the enzyme Cellulase is present in Mixture B of the present invention up to about 100 weight percent of the mass of Mixture B, and also from about 1 weight percent to about 90 weight percent, preferably from about 10 weight percent to about 35 weight percent, and most preferably from about 15 weight percent to about 25 weight percent of the mass of the composition.

A suitable source of the enzyme Amylase is present in Mixture B of the present invention up to about 100 weight percent of the mass of Mixture B, and also from about 1 weight percent to about 90 weight percent, preferably from about 10 weight percent to about 35 weight percent, and most preferably from about 15 weight percent to about 25 weight percent of the mass of the composition.

A suitable source of the enzyme Protease is present in Mixture B of the present invention from about 100 weight percent of the mass of Mixture B, and also from about 1 weight percent to about 90 weight percent, preferably from about 10 weight percent to about 35 weight percent, and most preferably from about 15 weight percent to about 25 weight percent of the mass of the composition.

A suitable source of the enzyme Lipase is present in Mixture B of the present invention up to about 100 weight percent of the mass of Mixture B, and also from about 1 weight percent about 90 weight percent, preferably from about 10 weight percent to about 35 weight percent, and most preferably from about 15 weight percent to about 25 weight percent of the mass of the composition of the present invention referred to as Mixture B.

Also as part of Mixture B, this optionally living tissue preparation is of the pancreatic and kidney types.

A suitable source of the pancreatic preparation named Pancreatic (Hiatt Distributors Limited) is present in Mixture B of the present invention, from about 100 weight percent of the mass of Mixture B, and also from about 1 weight percent to about 90 weight percent, preferably from about 10 weight percent to about 35 weight percent, and most preferably from about 15 weight percent to about 25 weight percent of the mass of the composition of the present invention referred to as Mixture B.

A suitable source of the kidney preparation named Microbia (Hiatt Distributors Limited) is present in Mixture B of the present invention, up to about 100 weight percent of the mass of Mixture B, and also from about 1 weight percent to about 90 weight percent, preferably from about 10 weight percent to from about 35 weight percent, and most preferably from about 15 weight percent to about 25 weight percent of the mass of the composition of the present invention referred to as Mixture B.

The compositions of the present invention may be employed to treat aqueous systems. The amount of the composition (Mixture A, or Mixture A plus Mixture B) of the present invention to treat 6,000 gallons of impure water is from about 0.21 pounds to about 10.0 pounds, preferably from about 0.75 pounds to about 6.0 pounds, and most preferably from about 1.25 pounds to about 3.0 pounds.

The present invention may include a mixture C comprised of a carbon species. In the past, particulate carbon was replaced periodically when used as a filter. It has been discovered that this effectively discards much of the living bacillus which uses the carbon pellets as a biological platform. In the present invention, particulate (pellitized) carbon comprising elemental carbon is used as a food source for the bacteria ingredients. It is elemental carbon.

Also the invention uses any carbon source to the extent it is soluble in water provides a measurable TOC (total organic carbon). The portion is solution will be available as a food source for the bacteria. It is believed that the bacteria feeds on the dissolved carbon, which is further believed to continue to be produced as the cycle proceeds.

This discovery therefore calls for leaving the carbon particulates in contact with the treatment subject as a permanent bacterial platform. Thus the carbon particulates are used in liquid remediation along with the bacillus ingredients. This speeds up the denitrifying process so that completion can be accomplished in as little as one day.

Therefore, Mixture C may be incorporated in the present invention to impart nourishment to the biological aquacultures of the present invention, and to provide a growing surface for the cultivation of the bacterial colonies of the present invention. The carbon source is chosen from the group consisting of coal, coconut shell, or synthetic lignite. The amount of the carbon source is preferably about 0.1667 times the number of gallons of the treatment subject.

Mixture A is considered as being grouped into and is preferably prepared as five groups of ingredients.

Group 1 is:
 Bacillus subtillis;
 Bacillus sphaericus;
 Bacillus megatarium; and
 Bacillus licheniformis.

Group 2 is:
 Enterobacter sakazakii; and
 Bacillus coagulans.

Group 3 is:
 Bacillus cereus.

Group 4 is:
 Bacillus pasteurii;
 Bacillus cirroflagellosus.

Group 5 is:
 Bacillus pumilus

The groups are prepared in the desired concentration and then mixed together.

It is normal that the bacteria will be prepared for use in a mixture with a carbon based carrier. For example bran flake (Purina) is used in concentrations of 1 part dry bacteria mixture to about 40 parts of bran flake.

For convenience, any aqueous body, wastewater stream or system or whatever body is to be treated is referred to herein as the treatment subject. Also, for convenience, the mixture of ingredients used for treatment will be referred to as the treating mixture.

It has been found that if Group 2 is omitted there is very little reduction in the ammonia content of the subject mixture compared to the use of the Group 2 ingredients.

This is taken to evidencing a synergistic affect because the ammonia oxidating organisms are in Group 1. The Group 1 ingredients are known to be active in reducing the levels of ammonia and nitrate aqueous species. The combination of Groups 1, 3, 4 and 5 show only very low levels of activity in reduction of aqueous ammonia species. The addition of Group 2 markedly accelerates not only the reduction of the amounts of aqueous ammonia species but also accelerates the rate of the consumption of all nitrogen waste in accordance with the classical nitrogen cycle.

In further particular the present method and mixture omits any nitrosomas, nitrobactor and pseudomonas or any other nitrofying non-bacillus bacteria, as was commonly used in the past, leaving a totally bacillus system having the Group 2 ingredients.

This results in faster reaction to reduce the quantity of ammonium nitrates and nitrites in a treatment subject.

The present invention therefore reduces the nitrogen cycle action from about 28 days, typically in the past, to 1–3 days. The rate of the process is temperature variable. The preferred temperature of treatment is from about 17° C.–45° C., most preferred being 21° C.–40° C. Thus this remediation treatment operates with bacillus spore cells in the absence of any vegetative cells. It is a totally aerobic process. In proper concentrations in treatment subject it can operate in 1–3 days.

Either one of *Bacillus subtillis* or *Bacillus licheniformis* can be used without the other but when both are used, an accelerated affect is seen over the use of either above such that the process can operate in as little as one day.

In one embodiment the invention is a mixture of bacillus in one particular having bacillus coagulans and absent any nitrosomas, nitrobacter, and pseudomonas providing thereby an all bacillus mixture of *Bacillus subtillis, Bacillus sphaericus, Bacillus megatarium, Bacillus licheniformis, Enterobacter sakazakii, Bacillus coagulans, Bacillus cereus, Bacillus pasteurii, Bacillus cirroflagellosus* and *Bacillus pumilus.*

In the alternative embodiment a carbon ingredient is used in contact with the treatment subject. This can be done using a carbon canister to pass the treatment subject through, or by free addition of carbon particulates into the treatment subject. This provides both a carbon source to increase the TOC of the treatment subject and also provides a biological platform for the bacillus ingredients. The TOC functions as a food source for the bacillus.

Other inorganic toxic aqeuous bodies, wastestreams and systems have also been successfully treated with the present invention. In particular, orthophosphates, heavy metals including trivalent and hexavalent chromium, have been successfully treated.

Organic and inorganic sulphur compounds are substantially reduced in levels in a short period of time (within 24 hours).

The invention will also consume algae, both micro algae and filament algae.

The invention has been successfully used for composting.

The invention has also been successfully used for in situ bioremediation of soil.

The invention has been used for the reduction of nitrate in drinking water.

The invention can be used in salt water, urine, fresh water and brackish water. In each case the ingredients are activated in the same medium in which they will be added for treatment or are poured directly into the treatment subject.

When treating soil, the ingredients are activated in water of concentrations between about 10 to about 1,000 ppm, preferably about 50 ppm.

Water is added to the soil to be treated, and the treatment mixture is added and mixed in the soil. An accelerant may be added if desired.

The following examples are illustrative of the present invention.

The present invention not only accelerates the rate of detoxification of nitrogen containing wastewater streams. It also will reduce the amounts of soluble and unsoluble, natural and synthetic, polymeric hydrocarbon components. In particular, oil, hydraulic fluid, aerosol, gasoline, mixed hydrocarbons, brake fluid, grease traps, soaps, PCB's and common sewage sludge, have been successfully treated.

For the following examples, in order to reduce the bulk of the text, the term "Mixture A" will be used to mean the mixture of ten bacteria which are: *Bacillus subtillis, Bacillus sphaericus, Bacillus megatarium, Bacillus licheniformis, Enterobacter sakazakii, Bacillus coagulans, Bacillus cereus, Bacillus pasteurii, Bacillus cirroflagellosus* and *Bacillus pumilus.*

EXAMPLE 1

This example describes results that show the present invention is useful in reducing the solid mass (sludge) of human sewage on an industrial scale. This example demonstrates that the invention works to reduce the amount of solids in raw sewage.

This test was carried out at a sewage treatment plant. To a 30 gallon container was added raw sewage effluent (the treatment subject), and this was circulated, via a pump, through two canister filters, each filled with 10 pounds of pelletized carbon (Tri-Base Pelletized Carbon from Hiatt Distributors). To the treatment subject while circulating was then added, shielded from the light, 20 grams of Mixture A comprising 2 grams of each ingredient. Samples were taken and analyzed for solid content. The results are shown in Table 1. This result conclusively shows that the invention significantly reduces the amount of solids in sewage waste effluent within 24 hours.

| Time (hr) | Sample Volume | Dried Mass (g) | Solids (mg/L) |
| --- | --- | --- | --- |
| 0/I | 500 mL | 43 | 9 |
| 0/E | 500 mL | 36 | 7 |
| 24/I | 500 mL | 28 | 6 |
| 24/E | 500 mL | 10 | 2 |
| 144/I | 500 mL | 25 | 5 |
| 144/E | 500 mL | 5 | 1 |

EXAMPLE 2

This example describes the treatment of a septic tank of about 700 U.S. gallons. In the dark, two tablespoons (about 28 grams) of Mixture A having equal amounts of each ingredient were placed directly into the septic tank through the inspection port. Analysis of the septic tank after 2 weeks showed: (1) A complete removal of solids; (2) complete elimination of odiferous chemicals, such as hydrogen sulfide; (3) complete unclogging of leach lines; (4) significant drop in the water level; and (5) reduction in the amount of nitrogen and phosphate waste.

EXAMPLE 3

This example demonstrates the denitryfication of nitroglycerine and explosives.

To a polyethylene pail was added 19 liters of non-chlorinated water, and a pump head filter was charged with 1 lb. of Tri-Base Pelletized Carbon (Hiatt Distributors Limited). The water was circulated through the carbon via an internal pump until a water temperature of 18° C. was maintained. The Mixture A solid bacterial (4.2 g) blend having an equal amount of each ingredient (i.e., 0.42 g each) was added, and after addition, the stirring was stopped and the resulting mixture was let stand for 45 minutes. To this was then added 1 gram of accelerant (Hiatt Distributors Limited Accelerant), and the resulting mixture was gently stirred for about 5 minutes, and then let stand. To this was then added, in small portions followed by gentle stirring, the explosive liquid composition until the level of 37 mg/L of nitrates registered on the test kit. A sample of this mixture was immediately removed and tested for nitrates. After 24 hours, the internal temperature was raised to 22° C., and maintained. Samples were removed at least every 24 hours and tested for nitrates, and this testing was repeated over time until no trace of nitrates remained. The results are:

| Time (hrs) | Concentration of Nitrates (ppm) |
| --- | --- |
| 0 | 37 |
| 24 | 22 |
| 45 | 3.5 |

EXAMPLE 4

This example demonstrates evidence that the bacterial composition of the present invention can be used to purify wastewater contaminated with waste streams created as a result of large scale production of nitrogen-bearing compound.

Two 200 gallon tanks were filled each with about 1,000 lbs. of activated tri base pelletized carbon (Tri-Base Pelletized Carbon), and assembled in-line with the waste reservoir from the plant production of Nutrasweet (aspartame). The effluent was circulated through the carbon by pump. About one pound was added to the effluent reservoir, of Mixture A having an equal amount of each ingredient, and the resulting mixture circulated at ambient temperature (28° C.) until no trace of Nutrasweet could be detected.

| Time (hrs) | Concentration of Ammonium (ppm) |
| --- | --- |
| 0 | 5 |
| 24 | 6 |
| 48 | 3 |
| 72 | 2.1 |
| 96 | 1 |
| 120 | 0.4 |
| 144 | 0.2 (limit of measuring equipment) |

EXAMPLE 5

This example demonstrates the facile establishment of the nitrogen cycle in aquariums. For a 5 gallon aquarium, a separate chamber with was charged with 1 pound of Tri Base Pelletized Carbon (Hiatt Distributors Limited) the flow of water was started through the chamber. Added to the aquarium about 5 minutes before the release of the fish, were 4.2 grams of Mixture A having an equal amount of each ingredient. After the acclimation of a small number of fish, this mixture was released into the aquarium. The protein skimmer and uv light were turned off. This was maintained for 24 hours. The standard test for nitrates, ammonia and nitrites after 24 hours showed no presence of nitrogen waste, the limit of the measuring equipment being 0.2 mg/L.

EXAMPLE 6

The method of example 5 was repeated with a 20 gallon aquarium. The amount of carbon was 3.4 lbs. The amount of bacteria was the same. Analysis for nitrogen waste after 24 hours gave less than 0.2 mg/L nitrogen waste composition (the limit of the measuring equipment).

EXAMPLE 7

This example describes the results of the serial testing of sewage effluent for levels of ammonium ion, nitrates, and nitrites.

To a polyethylene pail was added 19 liters of non-chlorinated water, and a pump-head filter was charge with 1 lb. of tri base pelletized carbon (Tri-Base Pelletized Carbon, Hiatt Distributors Limited). The water was circulated via an internal pump until the water temperature of 25° C. was maintained. To this was added 0.9 mg/L of ammonium, 22.0 mg/L of nitrate, 7.5 mg/L of sodium nitrite and 1.9 mg/L nitrogen nitrite. The levels of these was measured using a HACH Ammonia Test Kit (model number DR 100 Colorimeter) which uses the Nessler Method of measuring Nitrogen/Ammonia. To the mixture was then added 4.2 g of Mixture A having an equal amount of each ingredient. There was no off gassing of toxic gasses. The results of the measurements for ammonium, nitrates and nitrites are described in Table 2.

These results show conclusively that: (1) the present invention reduced the levels of nitrogen toxins significantly within 60 hours; and (2) metabolism of nitrate via bioreduction to ammonia or nitrites did not occur. This result strongly suggests the ultimate nitrogen metabolite (or end product) is molecular nitrogen (N2), which is a gas and lost to the atmosphere.

| TIME (hrs) | Ammonia Nitrogen (mg/L) | Nitrogen Nitrate (mg/L) | Nitrogen Nitrate (mg/L) | Sodium Nitrite (mg/L) |
| --- | --- | --- | --- | --- |
| 0 | 0.9 | 22.0 | 1.5 | 7.5 |
| 27.25 | 1.0 | 3.52 | 1.5 | 7.5 |
| 50.25 | 0.4 | 6.6 | 0.75 | 3.75 |
| 73.0 | 0.2 | 4.4 | 0.3 | 1.5 |

EXAMPLE 8

Mixture A, with equal amounts of each of the ingredients were added to warm water with sugar and tri-base pelletized carbon and enzymes. This was poured down a drain into a septic tank which was overflowing and smelled. In a short time the smell disappeared and the overflow was almost reduced to zero.

EXAMPLE 9

A 1,000 gallon grease trap in a restaurant was caked with cooking grease and released a strong odor of hydrogen sulfide when the cover was removed. Two tablespoons of Mixture A with equal amounts of each ingredient was poured into the tank. Two weeks later the grease had been consumed, the odor was gone and the fluid was clear.

EXAMPLE 10

The treatment subject was Synthetic mil Spec Hydraulic fluid containing 5.0 mg/L total organic halogen and 60 mg/L of total organic carbon. 50 ml of the fluid was added to 100 ml of distilled water at 20° C. The mixture was combined by use of an air stove diffusing air in the mixture. A hydrocarbon destroyer was mixed in 50 ml of distilled water and added to the solution. After 24 hours, Group 1 of Mixture A alone in equal amount of each ingredient was added and 24 hours later a bacterial booster was added. In 21 days, the solution was analyzed. The total organic halogens were reduced from 5.0 mg/L to non-detectable. The total organic carbon was reduced from 60.0 mg/L to 01.990 mg/L. Although a total Mixture A was tried, it was unsuccessful.

EXAMPLE 11

The treatment subject was a sample containing a mixture of diesel fuels, petroleum distillates (penta), creosote, and PCBs. Group 1 alone in equal amounts of each ingredient was used successfully to destroy the diesel fuels, petroleum distillates (penta), creosote and 30% of the PCBs. Then hydrocarbon destroyer and hydrocarbon destroyer booster (Hiatt Distributors Limited) was also used. The remainder of the PCBs were destroyed within two days by the hydrocarbon destroyer and booster.

EXAMPLE 12

The treatment subject is a 12,000 gallon commercial septic tank. when the manhole was opened a burst of vapor shot approximately thirty feet high. The tank was located 20 feet below ground. Upon inspection a strong odor of $H_2S$ came from the tank, strong enough to require a respirator when working with the tank. The top of the tank had a 3.5 foot solid grease cake which required 20 minutes to make a hole to the water. When the hole was finished, the water in the tank came to surface level. 20 pounds of the tri base pelletized carbon pellets was put in the tank followed by Mixture A having equal amounts of each ingredient. The manhole cover was closed.

Twelve hours later the tank was opened. The $H_2S$ odor was nearly undectable and did not require a respirator. Sixty percent of the grease cake was dissolved and the water level had dropped 2.5 feet.

EXAMPLE 13

This test was conducted to determine if Mixture A having equal amounts of each ingredient would reduce nitrates aerobically for drinking water within a very short time. Raw water was taken from a well that contained 90 ml/L of nitrate ($NO_3$). Tri base pelletized carbon and Mixture A having equal amounts of each ingredient were added. After two days the nitrates were reduced to 4 ml/L.

EXAMPLE 14

A bottle of Joy liquid had been dumped into the 300 gallon central filtration system for tropical fish in a pet shop. All the fish were dead. Soap bubbles were overflowing.

All tanks and the central system were drained of water. The tanks were not scrubbed or rinsed. Without removal of the gravel or tank decorations, the system was refilled with fresh water. 50 pounds of Tri-Base pelletized carbon (Hiatt Distributors Limited) was added to the main filter. Mixture A having equal amounts of each ingredient was added. The system was allowed to run. Goldfish were added after four hours. Two hours later twenty percent of the goldfish had died. The rest survived. After 12 hours, a medium load of tropical fish were added to the system. The death loss was only 1.5% for the new tropical fish. The Mixture A and tri base pelletized carbon destroyed the soap residue in the system and allowed the fish to remain alive. When soap is introduced in any system, the usual time to reintroduce fish is between 3–4 weeks only after extensive cleaning of the system.

EXAMPLE 15

An aquaculture system was invaded with filamentous (hair) algae. Other products had failed to eradicate the problem. The algae was smothering the organisms. It appeared as if the total system would have to be emptied and sterilized. Using 33.34 pounds of tri-base carbon, and Mixture A having equal amounts of each ingredient, and a metal removing treatment (Metal Gone—Hiatt Distributors Limited), within 10 days, a vast reduction of algae was noted. Two weeks later, the system was completely clear of the filamentous algae.

EXAMPLE 16

A pollution problem consisted of a motor oil spill on an underground lake. Also present was ammonium in the water. A pilot test was set up to determine if Mixture A would consume the oil concurrently performing the fast nitrogen elimination process.

A five gallon glass tank was set up with 2 pound of tri-base pelletized carbon in two Marineland Bubble Filters. The treatment subject water was treated with cholorabsorb to reduce the chlorine and chloramines. The water chemistry was raised with ammonium hydroxide to 5 mg/L. 200 ml of Castor Oil 20–50 weight was poured into the glass tank. The tank was heavily aerated when air was blown through the filters. Mixture A having equal amounts of each ingredient was activated in a glass jar. This mixture was allowed to sit for twenty minutes. An air stone was added to aerate the mixture. This mixture was then poured into the tank.

On the third day, a fifty percent reduction of ammonium had occurred and was converted into nitrite. The forth day the nitrite was converted into nitrates. By day ten, no nitrous compounds were detected. By the thirteenth day, all the oil had been consumed.

EXAMPLE 17

A test was conducted to establish that Mixture A, having equal amounts of each ingredient would reduce algae to either an acceptable level or completely destroy the organisms.

Four ten gallon aquariums were filled with tap water. Chlorabsorb was used to negate the chlorine and chloramines.

The tanks were set outside and in direct sunlight and were inoculated with the following algaes:

Tank one: Species of filamentous algae

Tank two: Species of Blue Green, Red, Green and Brown algae/

Tank three: Combined species of filamentous algae, Blue Green, Red, Green and Brown algae.

Tank four: Englena (green water) was introduced to the tank.

The tanks were aerated with a single air stone each so that the water would not become stagnant. A plant fertilizer was put in each tank at the rate of 1.0 grams per day every other day for three days. By two weeks, the algae had covered the tank walls, and was shearing off. Some algae was floating in the middle of all three tanks. The tank with Englena was of pea soup consistency. One could not see a hand on the opposite side of the tank because of the density of the organism.

Mixture A having equal amounts of each ingredient was added to the tanks on the 15th day. In tanks one, two and three, within seven days the vast amount of algae had turned brown and was dead. By the thirteenth day, all algae was dead. By day thirty, all algae had been consumed and their remains were a thin layer of decomposed material at the bottom of the tanks.

The tank with the Englena, slowly became clearer. By the tenth day, the tank was crystal clear. A thin layer of decomposed material was at the bottom of the tank.

EXAMPLE 18

A study was conducted to establish the reduction of phosphate and Phosphorus in water.

A new vat of 50 gallon capacity was set up with water having no bacteria or substrate. The tri-base pelletized carbon was put in an outside filter. The carbon was not washed, as it contains Phosphate. The level of Phosphorus acid in the water was raised to 5 mg/L. The correct amount, 8.3%, of Mixture A having equal amounts of each ingredient was poured in to the vat. The pump motor was turned on and the water was allowed to circulate through the water and the outside filter. Within one week all phosphorous compounds registered non-detectable on a HACH Tester whose minimum detectable amount is 0.2 mg/L.

EXAMPLE 19

A ten thousand gallon Koi pond was polluted with motor oil of unknown amount. The slick covered the surface of the water except where it was pushed back by the water fall. The fish were in great distress. Five pounds of Mixture A having equal amounts of each ingredient was put in. Within 24 hours the oil had been consumed and the pond returned to normal. The fish lived.

EXAMPLE 20

A study was conducted of Mixture A having equal amounts of each ingredient, as a composting tool for gardeners and farmers.

A pit was dug five feet deep, three feet wide, and ten feet long. The pit was filled with shredded tree branches. No other organic material was added. The pit was watered with tap water and allowed to soak. The next night, 14 grams of Mixture A having equal amounts of each ingredient was applied. It was applied in an area about two inches in diameter. The dry bacteria was covered with twigs and watered in. The pile was kept moist by watering every third or fourth day. The watering depended on the temperature and rate of evaporation. The pile was not turned or moved in any manner.

In six weeks, the area where Mixture A had been placed had dropped almost 2.5 feet. The un-inoculated areas were still five feet deep with little or no decrease. Visual examination proved that the inoculated material had been consumed by Mixture A and converted into compost. This was accomplished without the addition of a high nitrogen base material or turning the pile.

EXAMPLE 21

A 2,000 gallon salt water tank had developed a leak in the cooling system. Oil spread in the aquarium and threatened to kill all the fish and invertebrates by smothering them with oil. The leak was not discovered immediately and by the time it was discovered the tank was in great distress.

The system's bio-balls were replaced with 33.4 pounds of tri-base pelletized carbon. Then 1 pound of Mixture A having equal amounts of each ingredient was added. Within twenty four hours, the oil on top of the tank was consumed. The oil that had covered some organisms had broken up. Within the next twenty four hours, the tank's nitrogen cycle was back in place and no oil was present.

END OF EXAMPLES

In addition to the effect on nitrogen and contaminants such as reduction of the amount of ammonia, nitrates and nitrites in an aqueous environment, the present invention has been found to be oil consuming, sludge reducing, phosphorus and sulfur reducing and algae consuming (both filament type and micro type) and soap consuming. It will work in a clogged grease trap, and on land will performing composting action and bioreduction. It can be used in fresh water, salt water, brine and brackish water. It will tolerate and consume a higher concentration of copper and other heavy toxic metals in the treatment subject, to at least 100 mg/L and as high as 1800 mg/L.

Although particular embodiments of the invention have been described and illustrated herein, it is recognized that modifications and variations may readily occur to those skilled in the art, and consequently it is intended that the claims be interpreted to cover such modifications and equivalents.

I claim:

1. A method of treating a nitrogen containing aqueous treatment subject for the purpose of denitrification comprising adding to the treatment subject a mixture of bacteria including *Enterobacter sakazakii* and *Bacillus coagulans*.

2. The method of claim 1 wherein said mixture of bacteria further comprises:

*Bacillus subtillis,*

*Bacillus sphaericus,*

*Bacillus megatarium,*

*Bacillus licheniformis,*

*Bacillus cereus,*

*Bacillus pasteurii,*

*Bacillus cirroflagellosus*, and

*Bacillus pumilus.*

3. The method of claim 1 wherein said mixture of bacteria further comprises bacillus bacteria including one of;

a) *Bacillus licheniformis,* b) *Bacillus subtillis*, and c) *Bacillus licheniformis* and *Bacillus subtillis.*

4. The method of claim 1 wherein said mixture includes bacteria limited to bacillus bacteria.

5. The method of claim 1 further comprising adding to said treatment subject a selected quantity of particulate carbon.

6. The method of claim 1 further comprising adding an enzyme component to said treatment subject.

7. The method of claim 1 further comprising adding to said treatment subject one of;

a) a pancreatic ingredient, b) a kidney ingredient, and c) both a pancreatic ingredient and a kidney ingredient.

8. The method of claim 2 wherein said mixture of bacteria contains from about 1 to about 20 weight percent of each of said bacteria.

9. The method of claim 2 wherein said mixture of bacteria contains from about 6 to about 15 weight percent of each of said bacteria.

10. The method of claim 2 wherein said mixture of bacteria contains about 10 weight percent of each of said bacteria.

11. The method of claim 2 further comprising adding an enzyme to said treatment mixture.

12. The method of claim 3 wherein said mixture further comprises;

*Bacillus sphaericus,*

*Bacillus megatarium,*

*Bacillus cereus,*

*Bacillus pasteurii,*

*Bacillus cirroflagellosus*, and

*Bacillus pumilus.*

13. The method of claim 1 wherein said enzyme component is one of;

a) Cellulase, b) Amylase, c) Protease, d) Lipase, e) Cellulase, Amylase, Protease and Lipase, f) Cellulase, Amylase and Lipase g) Amylase, Protease, and Lipase h) Protease and Lipase i) Cellulase and Amylase j) Cellulase and Protease k) Cellulase and Lipase l) Amylase and Protease m) Amylase and Lipase.

14. The method of claim 13 wherein said enzyme component is present in the range up to about 100 weight percent.

15. The method of claim 13 wherein said enzyme component is present in the range from about 10 to about 35 weight percent.

16. The method of claim 13 wherein said enzyme is present in the range from about 15 to about 25 weight percent.

17. A method of denitrification of an aqueous treatment subject comprising;

adding to said treatment subject a mixture which includes bacteria limited to at least two bacillus bacteria.

18. The method of claim 17 wherein said mixture contains one of;

a) *Bacillus subtillis,* b) *Bacillus licheniformis*, and c) *Bacillus subtillis* and *Bacillus licheniformis.*

19. The method of claim 17 wherein said mixture contains said bacillus bacteria in equal amounts.

20. The method of claim 17 further comprising adding to said treatment subject a selected quantity of particulate carbon.

21. The method of claim 17 further comprising adding to said treatment subject a selected quantity of an enzyme component.

22. The method of claim 17 further comprising adding to said treatment subject a selected quantity of one of a) a pancreatic ingredient, b) a kidney ingredient, c) a pancreatic ingredient and a kidney ingredient.

23. The method of claim 18 wherein said mixture further comprises;

*Bacillus sphaericus,*

*Bacillus megatarium,*

*Bacillus cereus,*

*Bacillus coagulans,*

*Bacillus pasteurii,*

*Bacillus cirroflagellosus*, and

*Bacillus pumilus.*

24. The method of claim 17 wherein said mixture contains said bacillus ingredients in the range of about 1 to about 20 weight percent.

25. The method of claim 17 wherein said mixture contains bacillus ingredients in the range of about 6 to about 15 weight percent.

26. The method of claim 17 wherein said mixture contains said bacillus ingredients in the range of about 10 weight percent.

27. A method of denitrification of an aqueous treatment subject comprising:

adding to said treatment subject a mixture of at least two bacillus bacteria which contains ingredients selected from the group consisting of a) *Bacillus subtillis;* b) *Bacillus licheniformis;* and c) *Bacillus subtillis* and *Bacillus licheniformis;* and further wherein said mixture is absent ingredients selected from the group consisting of (a) nitrosomas, nitrobacter or pseudomonas;
(b) nitrosomas and nitrobacter;
(c) nitrosomas and pseudomonas;
(d) nitrobacter and pseudomonas;
(e) nitrosomas;
(f) nitrobacter; and
(g) pseudomonas.

28. A method of denitrification of an aqueous treatment subject comprising:

adding to said treatment subject a mixture which contains *Bacillus coagulans* and *Enterobacter sakazakii*.

29. A method of denitrification of an aqueous treatment subject comprising;

adding to said treatment subject a mixture which comprises;

*Bacillus subtillis,*

*Bacillus sphaericus,*

*Bacillus megatarium,*

*Bacillus licheniformis,*

*Bacillus cereus,*

*Bacillus coagulans,*

*Enterobacter sakazakii,*

*Bacillus pasteurii,*

*Bacillus cirroflagellosus*, and

*Bacillus pumilus.*

* * * * *